United States Patent Office.

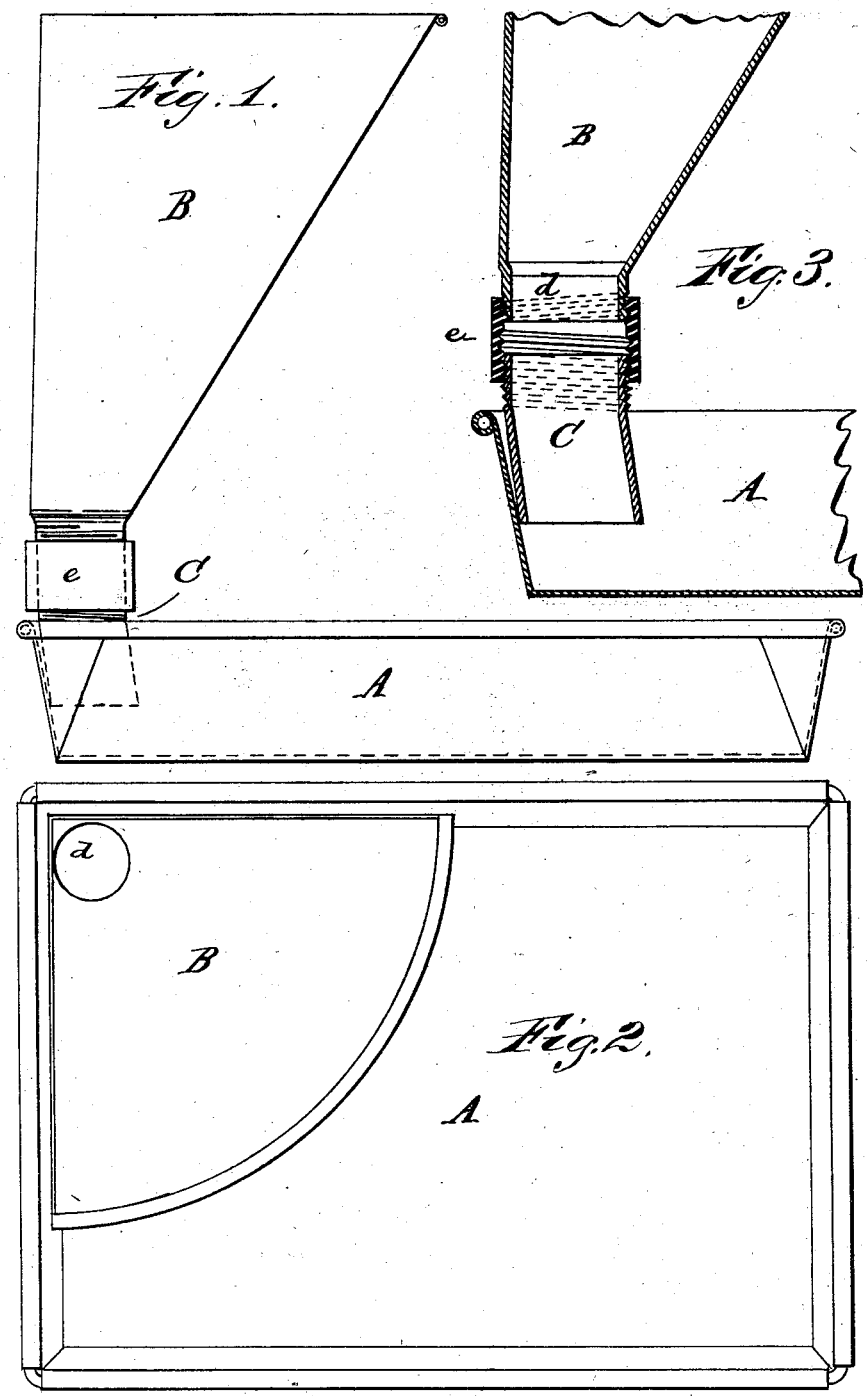

ORRIN CLARK BURDICT, OF BUFFALO, NEW YORK.

MANGER.

SPECIFICATION forming part of Letters Patent No. 256,636, dated April 18, 1882.

Application filed January 10, 1882. (No model.)

*To all whom it may concern:*

Be it known that I, ORRIN CLARK BURDICT, of Buffalo, in the county of Erie and State of New York, have made an invention of a new and useful Improvement in Mangers for Feeding Animals; and I do hereby declare that the following is a full, clear, and exact description and specification of the same.

When grain is placed in bulk in mangers before horses they are apt to eat greedily of the same without properly masticating it; hence much of the food is wasted in substance, while other portions of it are ejected from the manger by the motions of the animal.

The object of the present invention is to avoid the waste and bad effects upon the animal incident to too rapid feeding by enabling the grain to be supplied to the manger in a regulated quantity, so that the horse can eat no faster than the rate at which the grain is supplied.

To this end my invention consists of the combination of devices which is recited in the claim at the close of this specification.

In order that the same may be fully understood I have represented in the accompanying drawings the mode in which I have embodied the invention for practical use.

Figure 1 of said drawings represents a front view of my feed-regulating manger. Fig. 2 represents a plan of the same. Fig. 3 represents a section of part of the same.

The said manger consists of three principal members, which are the open feed trough or pan A, the grain-hopper B, and the nozzle C of the grain-hopper. The feed-pan A is, by preference, made of cast-iron and in a form adapted to be secured in one corner of the stall in which the animal is kept. It is open at the top, so that the animal can readily insert his mouth into it, and its sides and bottom prevent the lateral and downward escape of grain. It is also, by preference, made shallow.

The grain-hopper B is arranged above the open feed-pan, and is made tapering, so that the grain is converged toward the delivery-spout $d$, through which the grain passes to the open feed-pan A beneath. The grain placed in the hopper runs through the spout $d$ and delivers into the feed-pan, whence it is eaten by the animal. In order, however, that the animal may be compelled to eat at a regulated rate the nozzle C of the feed-spout $d$ is made adjustable relatively to the feed-pan by being connected, by means of a screwed coupling, $e$, with the neck of the feed-spout. When the nozzle is screwed downward the space between its lower end and the bottom of the feed-pan is contracted, and when the nozzle is screwed upward this space is enlarged, and as the size of this space determines the rate of delivery of the grain from the hopper to the open feed-pan the user has it in his power to regulate the supply to the feed-pan by setting the adjustable nozzle in different positions and to thereby control the rate at which the horse can feed. Moreover, as there is but comparatively little grain in the open feed-pan at any time, the animal is not likely to eject it therefrom, and I find that the grain is eaten much more thoroughly than when placed in mass in an ordinary manger.

I claim as my invention—

The combination, substantially as before set forth, of the open feed-pan, the grain-hopper, and the adjustable screw-nozzle of said hopper.

In witness whereof I have hereto set my hand this 30th day of December, A. D. 1881.

ORRIN CLARK BURDICT.

Witnesses:
R. S. HOWARD,
P. P. BURTES.